(12) United States Patent
Quinn et al.

(10) Patent No.: US 9,697,635 B2
(45) Date of Patent: *Jul. 4, 2017

(54) GENERATING AN AVATAR FROM REAL TIME IMAGE DATA

(71) Applicant: MICROSOFT TECHNOLOGY LICENSING, LLC, Redmond, WA (US)

(72) Inventors: David J. Quinn, Seattle, WA (US); Peter Alan Ridgway, Warwickshire (GB); Nicholas David Burton, Derbyshire (GB); Carol Clark, Desborough (GB); David T. Hill, Birmingham (GB); Christian F. Huitema, Clyde Hill, WA (US); Yancey C. Smith, Kirkland, WA (US); Royal D. Winchester, Sammamish, WA (US); Iain A. McFadzen, Leicestershire (GB); Andrew John Bastable, Warwickshire (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,667

(22) Filed: Oct. 17, 2016

(65) Prior Publication Data

US 2017/0039752 A1 Feb. 9, 2017

Related U.S. Application Data

(63) Continuation of application No. 14/070,481, filed on Nov. 1, 2013, now Pat. No. 9,508,197.

(51) Int. Cl.
*G06T 13/40* (2011.01)
*G06T 17/20* (2006.01)
(Continued)

(52) U.S. Cl.
CPC ............ *G06T 13/40* (2013.01); *A63F 13/655* (2014.09); *G06F 3/012* (2013.01);
(Continued)

(58) Field of Classification Search
None
See application file for complete search history.

(56) References Cited

U.S. PATENT DOCUMENTS 6,876,364 B2    4/2005 Buddemeier et al.
8,269,779 B2    9/2012 Rogers et al.
(Continued)

OTHER PUBLICATIONS

Zollhofer, Michael, et al., "Automatic reconstruction of personalized avatars from 3D face scans," Computer Animation and Virtual Worlds, 22.2-3 (2011): 195-202.
(Continued)

*Primary Examiner* — Vu Nguyen
(74) *Attorney, Agent, or Firm* — Vierra Magen Marcus LLP

(57) ABSTRACT

Technology is disclosed for automatically generating a facial avatar resembling a user in a defined art style. One or more processors generate a user 3D head model for the user based on captured 3D image data from a communicatively coupled 3D image capture device. A set of user transferable head features from the user 3D head model are automatically represented by the one or more processors in the facial avatar in accordance with rules governing transferable user 3D head features. In some embodiments, a base or reference head model of the avatar is remapped to include the set of user head features. In other embodiments, an avatar head shape model is selected based on the user 3D head model, and the transferable user 3D head features are represented in the avatar head shape model.

20 Claims, 12 Drawing Sheets

(51) Int. Cl.
| | |
|---|---|
| G06T 15/50 | (2011.01) |
| G06T 19/20 | (2011.01) |
| G06F 3/01 | (2006.01) |
| G06T 7/00 | (2017.01) |
| G06T 7/60 | (2017.01) |
| G06K 9/00 | (2006.01) |
| A63F 13/655 | (2014.01) |
| A63F 13/213 | (2014.01) |

(52) U.S. Cl.
CPC ..... *G06K 9/00281* (2013.01); *G06K 9/00315* (2013.01); *G06T 7/0046* (2013.01); *G06T 7/60* (2013.01); *G06T 15/503* (2013.01); *G06T 17/205* (2013.01); *G06T 19/20* (2013.01); *A63F 13/213* (2014.09); *A63F 2300/5553* (2013.01); *G06T 2207/20036* (2013.01); *G06T 2207/30201* (2013.01); *G06T 2210/56* (2013.01); *G06T 2215/16* (2013.01); *G06T 2219/2012* (2013.01); *G06T 2219/2021* (2013.01); *G06T 2219/2024* (2013.01)

(56) References Cited

U.S. PATENT DOCUMENTS

| | | |
|---|---|---|
| 8,390,680 B2 | 3/2013 | Perez et al. |
| 2001/0019330 A1 | 9/2001 | Bickmore et al. |
| 2001/0033675 A1 | 10/2001 | Maurer et al. |
| 2006/0023923 A1 | 2/2006 | Geng |
| 2008/0215975 A1 | 9/2008 | Harrison et al. |
| 2009/0044113 A1 | 2/2009 | Jones |
| 2009/0215533 A1 | 8/2009 | Zalewski et al. |
| 2010/0123776 A1 | 5/2010 | Wydeven et al. |
| 2011/0304629 A1 | 12/2011 | Winchester |
| 2014/0267413 A1 | 9/2014 | Du |

OTHER PUBLICATIONS

Weise, Thibaut, et al., "Realtime performance-based facial animation," ACM Transactions on Graphics (TOG), vol. 30, No. 4, ACM 2011.

International Preliminary Report on Patentability dated Jan. 15, 2016 in International Patent Application No. PCT/US2014/062488, 7 pages.

Written Opinion dated Sep. 22, 2015 in International Patent Application No. PCT/US2014/062488, 5 pages.

Response to Written Opinion dated Jun. 25, 2015 in International Patent Application No. PCT/US2014/062488, 26 pages.

Simkute, et al., "An Overview of 3D Modelling for Facial Recognition," retrieved on: Apr. 27, 2013, 6 pages available at: http://www.idt.mdh.se/kurser/ct3340/ht10/FinalPapers/20-Simkute_Kuria.pdf.

Anthony, et al., "A Technical Analysis of Facial Motion Capture Systems," retrieved on: Apr. 27, 2013, 8 pages available at: http://mms.ecs.soton.ac.uk/2012/papers/12.pdf.

Blanz, et al., "A Morphable Model for the Synthesis of 3D Faces," Siggraph '99, 1999, 8 pages.

International Search Report and Written Opinion dated Mar. 26, 2015 in International Patent Application No. PCT/US2014/062488, 12 pages.

Thibaut Weise et al., "Realtime performance-based facial animation," ACM Transactions on Graphics, vol. 30, No. 4, Article 77, Publication date: Jul. 1, 2011 (Jul. 1, 2011), pp. 1-9.

Chi-Hyoung Rhee et al., "Cartoon-like Avatar Generation Using Facial Component Matching," International Journal of Multimedia and Ubiquitous Engineering, vol. 8, No. 4, Jul. 30, 2013 (Jul. 30, 2013), pp. 69-78.

Chen Cao et al., "3D shape regression for real-time facial animation," ACM Transactions on Graphics, vol. 32, No. 4, Article 41, Jul. 1, 2013 (Jul. 1, 2013), pp. 1-10.

Michael Zollhofer et al., "Automatic Reconstruction of Personalized Avatars from 3D Face Scans," Computer Animation and Virtual Worlds, vol. 22, No. 2-3, Apr. 12, 2011 (Apr. 12, 2011), pages 195-202.

Notice of Allowance and Fees Due mailed Aug. 11, 2016 for U.S. Appl. No. 14/070,481.

Non-Final Rejection mailed Oct. 29, 2015 for U.S. Appl. No. 14/070,481.

Final Rejection mailed May 23, 2016 for U.S. Appl. No. 14/070,481.

Amendment mailed Jul. 29, 2016 for U.S. Appl. No. 14/070,481.

Amendment mailed Feb. 1, 2016 for U.S. Appl. No. 14/070,481.

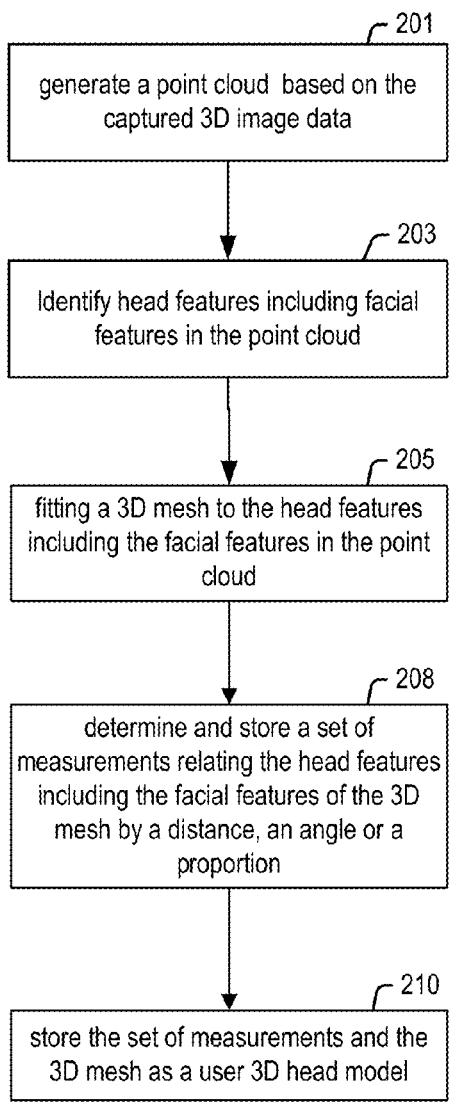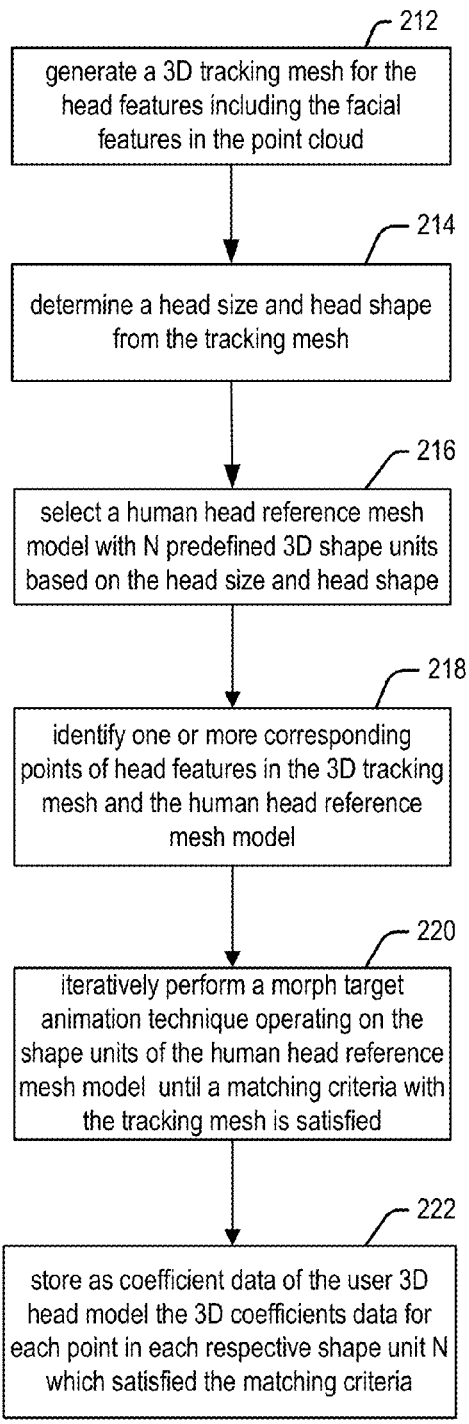
FIG. 5A
FIG. 5B

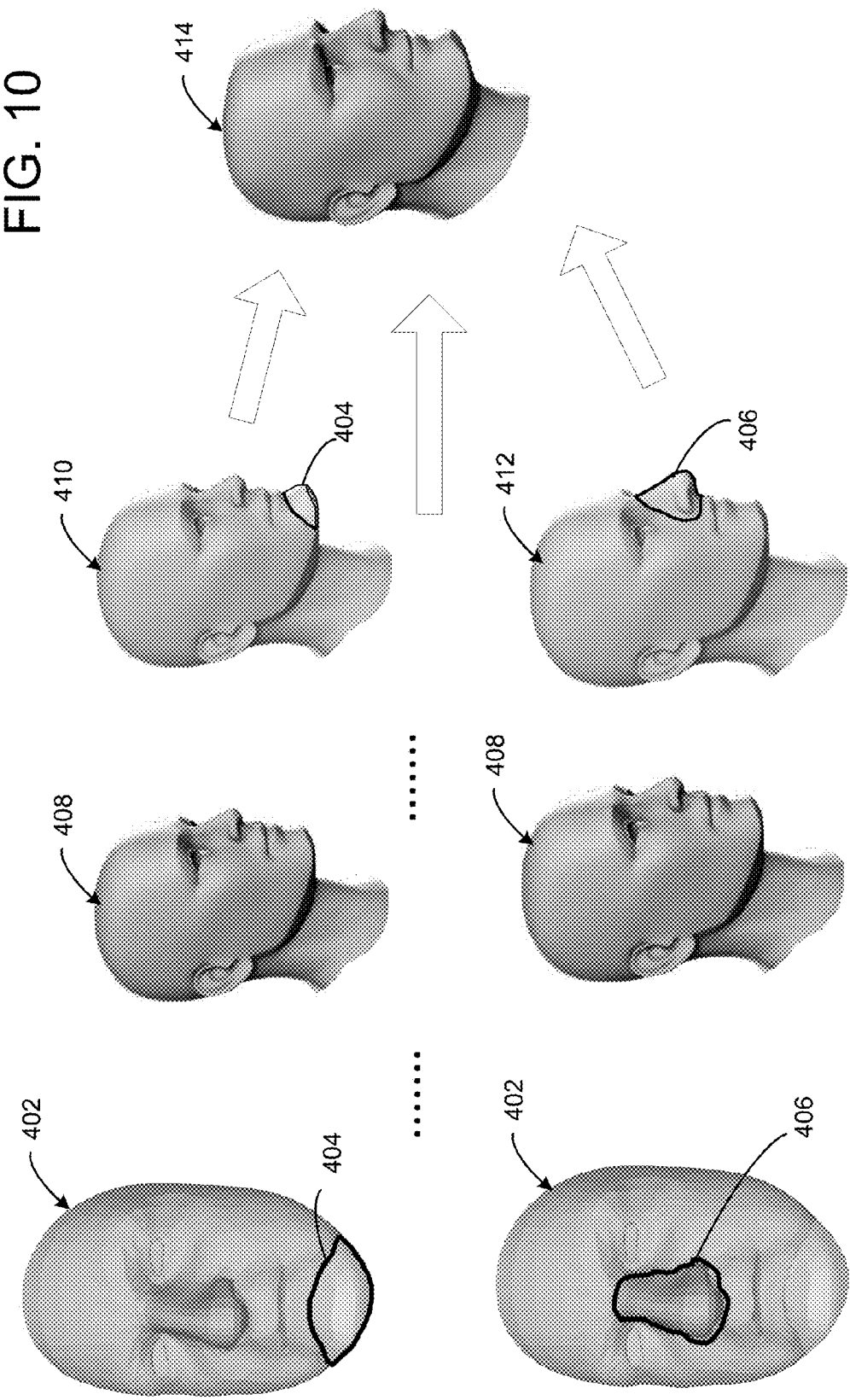

GENERATING AN AVATAR FROM REAL TIME IMAGE DATA

CLAIM OF PRIORITY

This application is a continuation of and claims priority to U.S. application Ser. No. 14/070,481 filed Nov. 1, 2013, entitled "GENERATING AN AVATAR FROM REAL TIME IMAGE DATA", published as US 2015/0123967 A1 on May 7, 2015, the entirety of which is incorporated herein by reference.

BACKGROUND

Controlling an avatar in a computer game or multimedia application enhances the reality of an unreal virtual environment for a user and enhances the user's engagement in the action. An avatar typically has skills which the user does not have in reality as part of the game or multimedia experience. Additionally, a user may be able to select clothing, hair style, and an eye color of the avatar, which may or may not resemble the actual user. However, no matter how different is the character selected to be the user's avatar, the user typically desires to see himself or herself in the avatar.

SUMMARY

The technology provides one or more embodiments for automatically generating a facial avatar resembling a user in a defined art style from real time image data tracking a user's face.

An embodiment of a method for automatically generating a facial avatar resembling a user in a defined art style comprises capturing three dimensional (3D) image data of user head features including facial features by a 3D capture device and generating a user 3D head model for the user based on the captured 3D image data by one or more processors communicatively coupled to the 3D capture device. A set of transferable user head features is identified by the one or more processors from the user 3D head model which can be represented in the facial avatar based on stored transferable head feature rules for the defined art style. A set of avatar character head features for representing the set of transferable user head features are identified as well by the one or more processors based on the transferable head features rules for the defined art style. The facial avatar is generated in the defined art style including the set of avatar character head features. The facial avatar is displayed by a display communicatively coupled to the one or more processors.

In another embodiment, one or more processor readable storage devices have encoded thereon instructions for causing one or more processors to perform an embodiment of a method for automatically generating a facial avatar resembling a user in a defined art style. The embodiment of the method comprises generating a user 3D head model for the user based on captured 3D image data by one or more processors communicatively coupled to a 3D capture device. A set of transferable user head features is identified by the one or more processors from the user 3D head model which set can be represented in the facial avatar based on stored transferable head feature rules for the defined art style. A set of avatar character head features for representing the set of transferable user head features are identified as well by the one or more processors based on the transferable head features rules for the defined art style. The facial avatar is generated in the defined art style including the set of avatar character head features and is displayed by a display communicatively coupled to the one or more processors. Additionally, the one or more processors update a facial expression of the facial avatar responsive to changes detected in user facial features, and update the displayed facial avatar with the updated facial expression.

An embodiment of a system for automatically generating a facial avatar resembling a user in a defined art style comprises one or more 3D image capture devices including one or more depth sensors, one or more displays, and one or more memories for storing measurement metrics for user 3D head data and rules identifying a set of transferable user head features which can be represented by the facial avatar. The system embodiment further comprises one or more processors having access to the one or more memories and being communicatively coupled to the one or more 3D image capture devices for receiving 3D image data including a depth value for user head features including facial features and being communicatively coupled to the one or more displays. The one or more processors generate a user 3D head model for the user based on the 3D image data and perform measurements of the user 3D head model in accordance with the measurement metrics for user 3D head data. The one or more processors automatically represent at least a subset of user head features from the user 3D head model in the facial avatar of the defined art style based on the rules identifying a set of transferable user head features and the measurements of the user 3D head model, and cause the one or more displays to display the facial avatar resembling the user in the defined art style.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5A illustrates a flowchart of an embodiment of a method for generating a user 3D head model based on captured 3D image data.

FIG. 5B illustrates a flowchart of a more detailed embodiment for generating a user 3D head model based on captured 3D image data.

FIG. 10 illustrates examples of an avatar base head model being morphed into an avatar incorporating the user facial features in accordance with a method like that described in FIG. 6B.

DETAILED DESCRIPTION

Figure 1A:
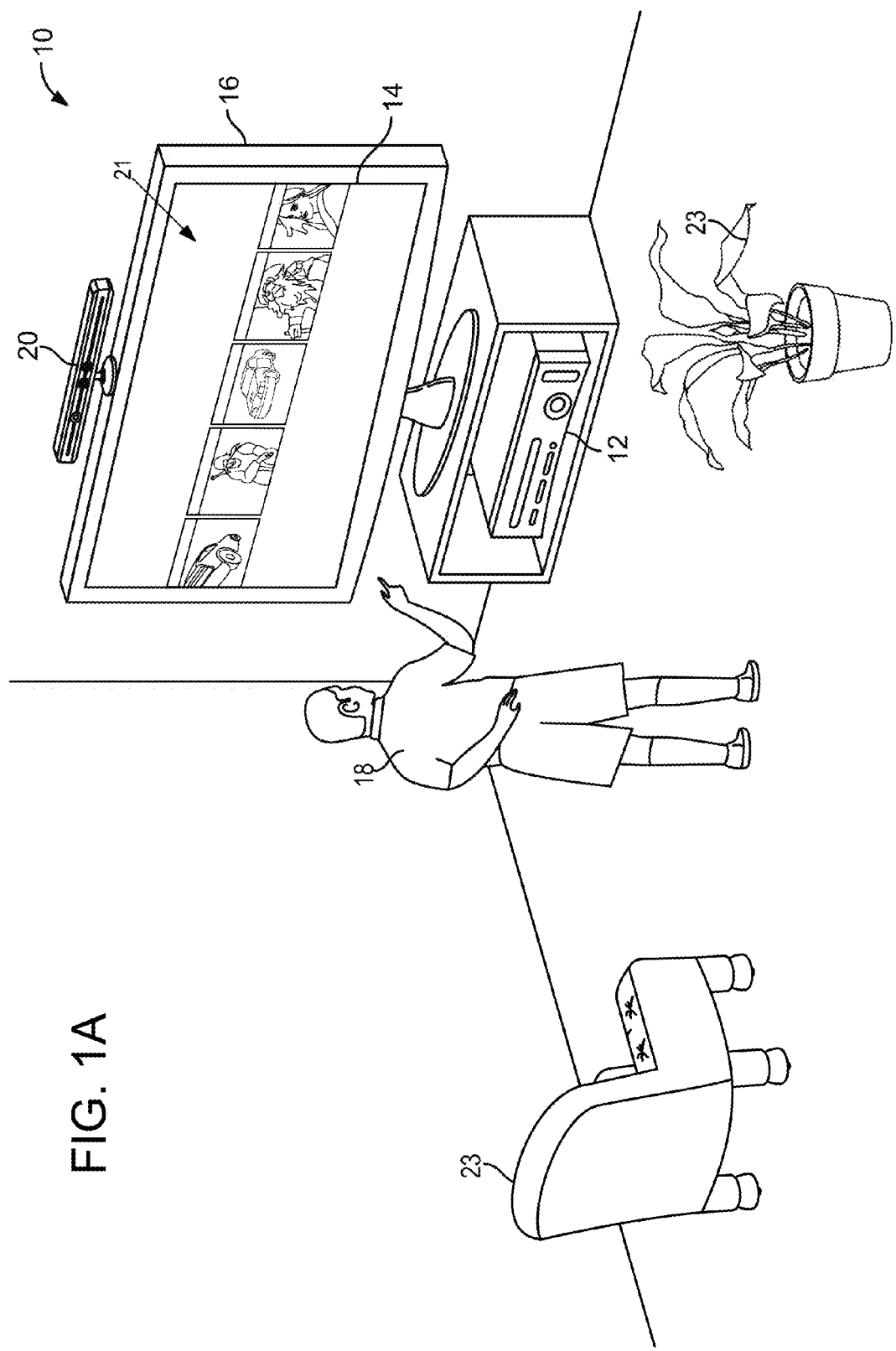
FIG. 1A illustrates an example embodiment of a target recognition, analysis, and tracking system in which embodiments of the technology may operate.

Technology is described for automatically generating a facial avatar in a defined art style which resembles a user based on image data captured of the user and a predetermined set of transferable head (including facial) features associated with the defined art style. In embodiments discussed below, human facial features can be represented in one or more shape units associated with a head model. As described further below, depth and image data of a user's head features including facial features can be captured. Typically, a point cloud of points having 3D Cartesian or polar coordinates with respect to an origin of a coordinate system can be used to represent the head and facial features by facial modelling software. A mesh, e.g. a triangular or polygon mesh, may be used to connect or fit the points of the point cloud.

Differences between the points or vertices in the mesh and a reference human head model can be identified and stored as coefficients of 3D space vectors. In some examples, the coefficients values may be between 0 and 1, where a 1 means an exact correspondence between a vertex in the fitted mesh and the corresponding vertex in the human head reference model. A shape unit is a collection of these 3D vertices which represents a head feature or an aspect of a head feature. If not just the boundary points of a shape unit but also the points on the interior of the shape unit only differ in scale from the human head reference model, then a scalar coefficient value between 0 and 1 may be applied to all the points in the shape unit at the same time, simplifying transformation operations for generating a 3D head model of the user's head and face. The more varied and detailed the collection of human head reference models stored, the more likely scalar coefficient operations on a shape unit may be performed.

A few examples of shape units are illustrated in the figures below, but embodiments of the technology may use numbers of space units like 50, 80 or even 300. Some examples of shape units are face center depth, nose height, jaw size, nose size, mouth size, eyes depth, mouth height, nose depth, eye size, face roundness, mouth width, eyes angle, nose pinch, eye width, face heart, face square, eye height, jaw height, face flat, cheek bones width, nose width, jaw curve, cheek bone size, forehead roundness, lip lower depth, forehead flat section, nose flesh fullness, lips thinness, nose bridge depth, jaw angle, cheeks sink, brow depth, nostrils width, jaw line depth, nose bridge slope, cheeks definition, jaw corner width, lip lower size, chin width, nose roundness, eyelids lower height, chin depth, forehead definition, eyelids smoothness, jaw definition, cheek fat, mouth side fat, jaw line, forehead line, and skull wideness. The shape units may incorporate measurements or provide a basis for making measurements which relate facial features, for example in terms of distance, angular position relationship and proportional size relationships. Position and proportion relationships help maintain a facial resemblance to a user despite differences in facial feature shapes distinctive to the avatar art style.

The art style defined for an avatar directs which user facial features are transferable to the avatar via a set of transferable head feature rules. For example, an avatar of an alien with in an art style dictating diamond shaped heads may indicate a jawline or jaw shape is not transferable, however proportions and angular relations between the eyes, nose and mouth as well as forehead height and chin height may be transferable. Some examples of transferable facial features which this diamond head shaped alien art style may allow are a distance between eye corners of the different eyes, lip shape, eye shape, and the distance between a nose tip and an upper lip in proportion to a face area. Another example is a distance from an eye corner to a tip of a nose in proportion to the face area. In some examples, one or more user head features are represented by one or more symbol features in the defined art style. For example, facial or head furniture like a hat style may be substituted for the head shape. A person with a round head wears a rounded woolen hat while a person with a square head wears a bucket style hat.

Two different approaches are described in the discussion of the figures below for automatically representing at least a subset of user head features in a facial avatar of a defined art style.

FIG. 1A illustrates an example embodiment of a target recognition, analysis, and tracking system in which embodiments of the technology may operate. In this contextual example, a user 18 is in his living room, as indicated by the illustrative background objects 23 of a chair and a plant. The user 18 interacts with a natural user interface (NUI) which recognized gestures as control actions. In this embodiment, the NUI is implemented with a 3D image capture device 20 in which field of view user 18 is standing, and a computer system 12. The user 18 selects a multimedia application from a menu being displayed under control of software executing on the computer system 12 on display 14 of a display monitor 16, a high definition television also in the living room in this example. The computer system 12 in this example is a gaming console, for example one from the XBOX® family of consoles. The 3D image capture device 20 may include a depth sensor providing depth data which may be correlated with the image data captured as well. An example of such an image capture device is a depth sensitive camera of the Kinect® family of cameras. The capture device 20, which may also capture audio data via a microphone, and computer system 12 together may implement a target recognition, analysis, and tracking system 10 which may be used to recognize, analyze, and/or track a human target such as the user 18 including the user's head features including facial features.

Other system embodiments may use other types of computer systems such as desktop computers, and mobile devices like laptops, smartphones and tablets including or communicatively coupled with depth sensitive cameras for capturing the user's head features and a display for showing a resulting personalized avatar. In any event, whatever type or types of computer systems are used for generating the facial personalized avatar, one or more processors generating the facial avatar will most likely include at least one graphics processing unit (GPU).

Suitable examples of a system 10 and components thereof are found in the following co-pending patent applications which also provide more information about identifying users, all of which are hereby specifically incorporated by reference: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009 and U.S. patent application Ser. No. 12/696,282, entitled "Visual Based Identity Tracking," filed Jan. 29, 2010.

Figure 1B:
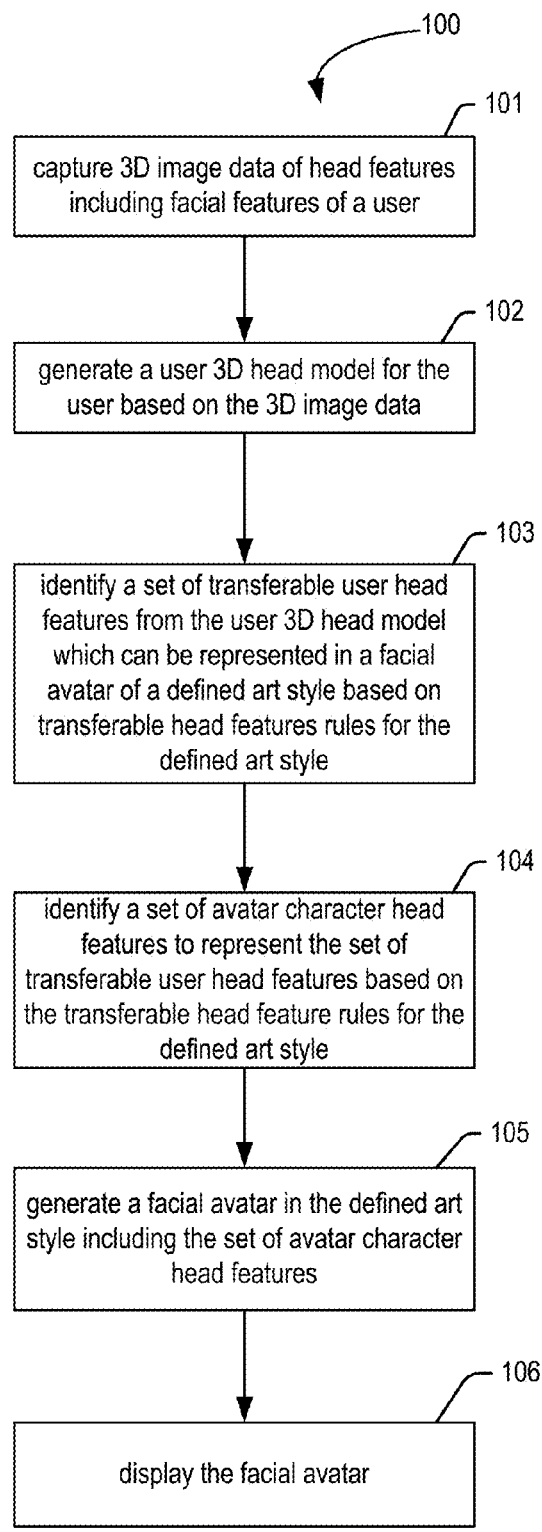
FIG. 1B illustrates a flowchart of an embodiment of a method for automatically generating a facial avatar resembling a user in a defined art style.

Before proceeding to discuss in more detail hardware and software components for a system for generating a facial avatar resembling a user in a defined art style, FIG. 1B illustrates a flowchart of an overview of a method embodiment for automatically generating a facial avatar resembling a user in a defined art style. In step 101, a 3D image capture device (e.g. 20) captures 3D image data of head features including facial features of a user, and in step 102, one or more software controlled processors of one or more computer systems communicatively coupled to the capture device generate a user 3D head model for the user based on the 3D image data. In step 103, the one or more processors identify a set of transferable user head features from the user 3D head model which can be represented in a facial avatar of a defined art style based on transferable head feature rules for the defined art style, and in step 104, the one or more processors identify a set of avatar character head features to represent the set of user head features based on rules for the defined art style. In step 105, the one or more processors generate a facial avatar in the defined art style including the set of avatar character head features and cause a communicatively coupled display to display the facial avatar in step 106. Additionally, a facial expression of the facial avatar may be updated and displayed responsive to changes detected in user facial features.

Figure 2:
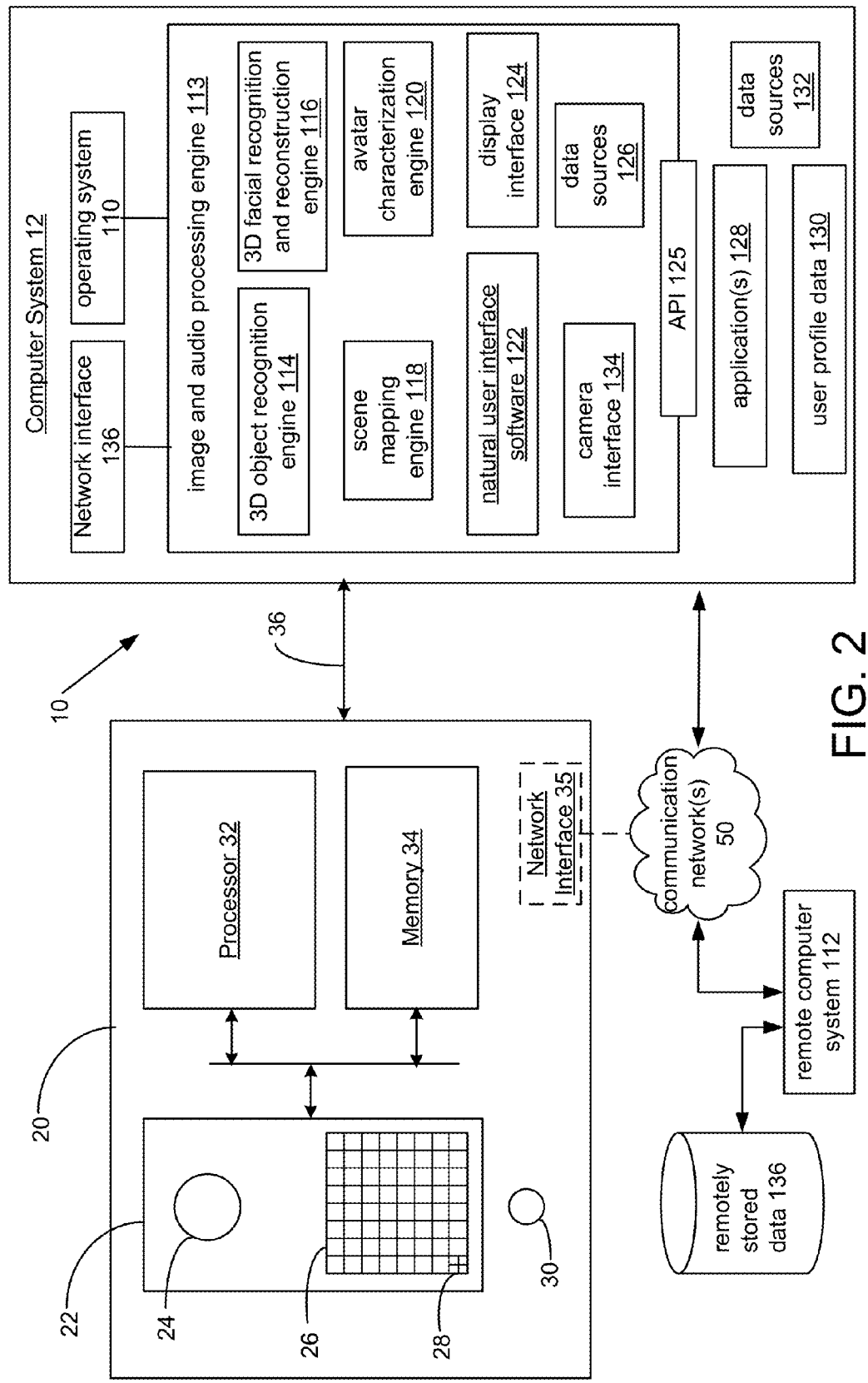
FIG. 2 illustrates an embodiment of a system including hardware and software components for automatically generating a facial avatar resembling a user in a defined art style.

FIG. 2 illustrates an embodiment of a system 10 including hardware and software components for automatically generating a facial avatar resembling a user in a defined art style. An example embodiment of the capture device 20 is configured to capture video having a depth image that may include depth values via any suitable technique including, for example, time-of-flight, structured light, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, this exemplary capture device 20 may include an image and depth camera component 22 which captures a depth image by a pixelated sensor array 26. A depth value may be associated with each captured pixel. Some examples of a depth value are a length or distance in, for example, centimeters, millimeters, or the like of an object in the captured scene from the camera. Sensor array pixel 28 is a representative example of a pixel with subpixel sensors sensitive to RGB visible light plus an IR sensor for determining a depth value for pixel 28. Other arrangements of depth sensitive and visible light sensors may be used. An infrared (IR) illumination component 24 emits an infrared light onto the scene, and the IR sensors detect the backscattered light from the surface of one or more targets and objects in the scene in the field of view of the sensor array 26 from which a depth map of the scene can be created. In some examples, time-of-flight analysis based on intensity or phase of IR light received at the sensors may be used for making depth determinations.

According to another embodiment, the capture device 20 may include two or more physically separated cameras that may view a scene from different angles, to obtain visual stereo data that may be resolved to generate depth information.

The capture device 20 may further include a microphone 30 to receive audio signals provided by the user to control applications that may be executing in the computer system 12 as part of the natural user interface.

In the example embodiment, the capture device 20 may include a processor 32 in communication with the image and depth camera component 22 and having access to a memory component 34 that may store instructions for execution by the processor 32 as well as images or frames of images captured and perhaps processed by the 3D camera. The memory component 34 may include random access memory (RAM), read only memory (ROM), cache, Flash memory, a hard disk, or any other suitable storage component. The processor 32 may also perform image processing, including some object recognition steps, and formatting of the captured image data.

As shown in the example of FIG. 2, the capture device 20 is communicatively coupled with the computer system 12 via a communication link 36 which may be wired or a wireless connection. Additionally, the capture device 20 may also include a network interface 35 and optionally be communicatively coupled over one or more communication networks 50 to a remote computer system 112 for sending the 3D image data to the remote computer system 112. In some embodiments, a processor of the computer system 12, or the remote computer system 112 may provide a clock to the capture device 20 that may be used to determine when to capture, for example, a scene.

In the illustrated example, computer system 12 includes a variety of software applications, data sources and interfaces. In other examples, the software may be executing across a plurality of computer systems, one or more of which may be remote. Additionally, the applications, data and interfaces may also be executed and stored remotely by a remote computer system 112 with which either the capture device 20 or the computer system 12 communicates. Additionally, data for use by the applications, such as rules and definitions discussed in more detail with respect to FIGS. 3A and 3B, may be stored locally 126, 132, be accessible via remotely stored data 136 or a combination of both.

In addition to one or more processors and accessible memory typically found in computer systems, computer system 12 comprises an operating system 110, a network interface 136 for communicating with other computer systems, a display interface 124 for communicating data, instructions or both, to a display like display 14 of display device 16, and a camera interface 134 for coordinating exchange of depth image data and instructions with 3D capture device 20. An image and audio processing engine 113 comprises natural user interface software 122 which may include software like gesture recognition and sound recognition software for identifying actions of a user's body or vocal cues which are commands or advance the action of a multimedia application. Additionally, 3D object recognition engine 114 detects boundaries using techniques such as edge detection and compares the boundaries with stored shape data for identifying types of objects. Color image data may also be used in object recognition. A type of object which can be identified is a human body including body parts like a human head. A scene mapping engine 118 tracks a location of one or more objects in the field of view of the 3D capture device. Additionally, object locations and movements may be tracked over time with respect to a camera independent coordinate system.

The 3D facial recognition and reconstruction engine 116 may identify head features including facial features from image data of the head location identified by the object recognition engine. The face is part of the head so the shape of one's nose is a facial feature and a head feature. Other features like ear position with respect to a user's eye and top of the skull shape are not on a user's face but are parts of the head typically viewed when looking at a user's face. The 3D facial recognition and reconstruction engine generates a user 3D head model for the user based on the captured depth image data or 3D image data. Embodiments of ways of generating the user 3D head model are discussed in the figures below. The avatar characterization engine 120 automatically represents at least a subset of user head features from the user 3D head model in a facial avatar of a defined style. Embodiments of how the avatar characterization engine 120 may implement the avatar representation are discussed in reference to the figures below. Data sources 126 are available for storing data locally for use by the software of the image and audio processing engine 113.

An application programming interface (API) 125 provides an interface for one or more multimedia applications 128 to register avatar characters and data definitions and rules for them associated with the applications. Data sources 132 may store these avatar data definitions and rules. Besides user specific data like personal identifying information including personally identifying image data, user profile data 130 may also store data or data references to stored locations of a user 3D head model generated for the user and avatars, including their facial aspects, generated for the user.

Figure 3A:
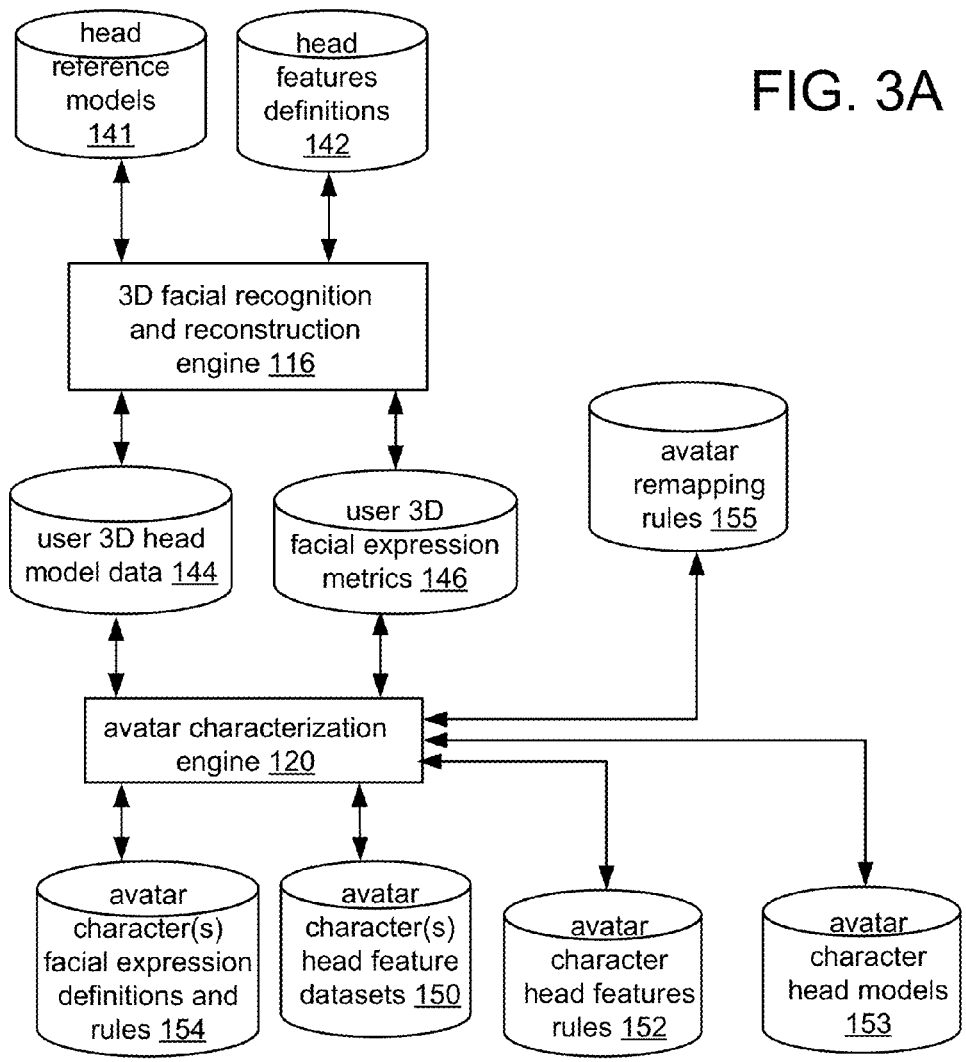
FIG. 3A illustrates an embodiment of a system from a software perspective for automatically generating a facial avatar resembling a user in a defined art style.

FIG. 3A illustrates an embodiment of a system from a software perspective for automatically generating a facial avatar resembling a user within a defined art style. The embodiment may be used to generate a model of the user's head and facial features, and then to generate a model of a facial avatar incorporating head features from the user's head model which head features are predetermined to be transferable to the avatar based on its defined art style. In this example, the 3D facial recognition and reconstruction engine 116 has access to datastores for use in generating user 3D head model data. Some examples of such datastores include head feature definitions 142 which provides parameters in terms of 3D shapes for head and facial features. An example of a head feature definition is a shape unit, some examples of which were provided above. Another example which may be used in some embodiments are head reference models 141 which are typically models for human heads but may also include heads for pets, as some applications may include avatars for pets. Facial features, for example as represented in shape units, can be determined from a tracking mask generated from image data of the user and fitted to a head reference model having a head shape similar to that of the user. In other embodiments, measurements of user head features, for example as shape units, determined from the tracking mask can be stored as data representing a user head model without using a head reference model, and retrieved later when generating the avatar. In some examples, a matching criteria may be used for identifying that user head model data measurements, e.g. measured shape units, qualify as accurately representing the tracking mask. The matching criteria may be defined in terms of an allowable offset in 3D between the vertices of a head reference model being morphed to result in the user's head model and vertices of the tracking mask. The matching criteria can be stored in the head features definitions 142 in some examples.

Figure 4A:
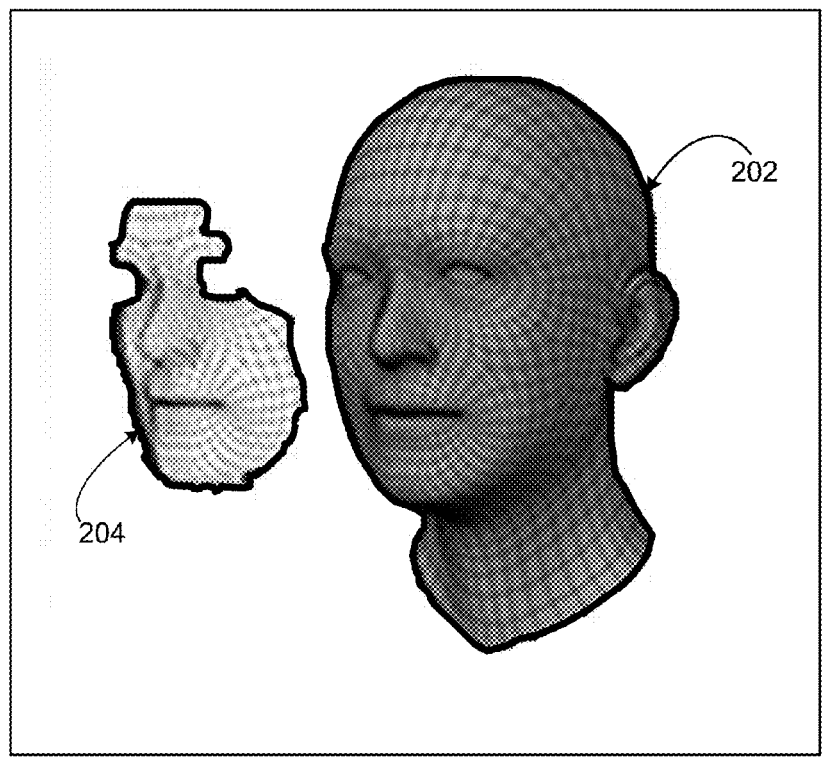
FIGS. 4A and 4B illustrate some examples of shape units of a 3D head model.
Figure 4B:
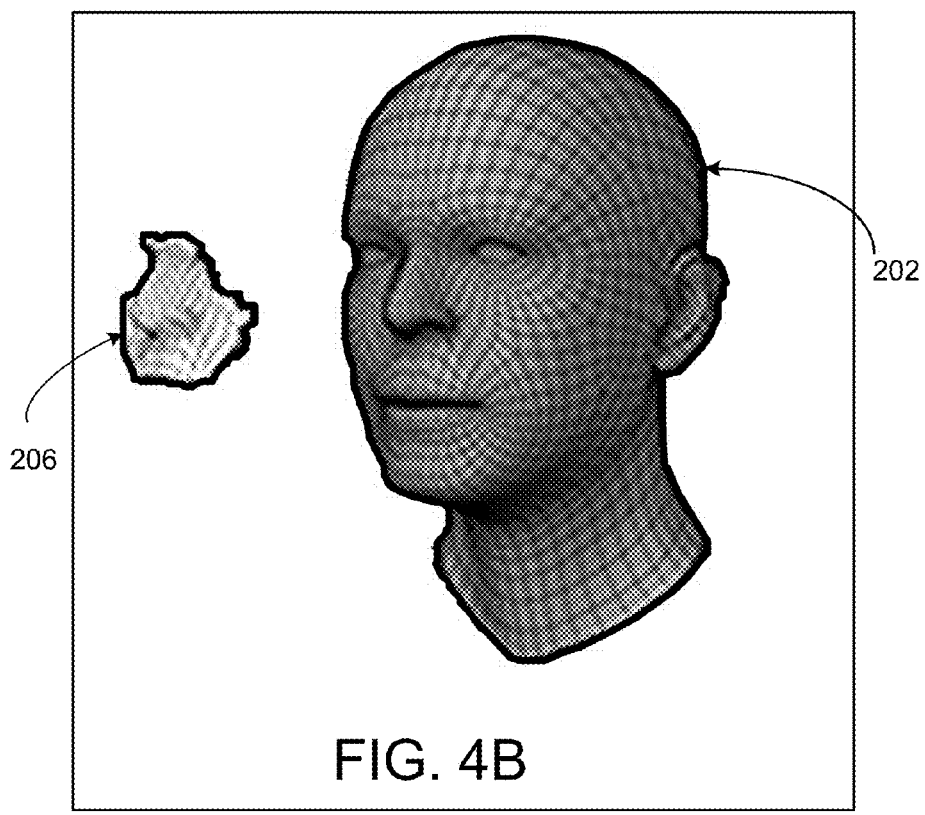

FIGS. 4A and 4B illustrate some examples of shape units of a 3D head model. As mentioned above, a shape unit is a collection of 3D points which represents a head feature or an aspect of a head feature. In the illustrated examples, the collection of 3D points is a set of vertices or connection points in a 3D head mesh which may also include a three dimensional (3D) rig which models human bone structure and bone movement under a skin surface which skin surface is represented by the mesh.

Three dimensional rigs are used in computer graphics for animating character facial expressions. The modeled bones may be in a hierarchical set of bones. Each bone has a 3D transformation which includes a position of the bone, scale of the bone and orientation of the bone, and optionally a parent bone. In the case of bone hierarchy, the full transform of a child bone node is the product of a transformation of its parent and its own transformation.

A head model 202 is displayed next to an exemplary shape unit 204 representing a face center shape unit which includes depth data as a mesh of 3D vertices. In the example of FIG. 4B, exemplary shape unit 206 represents the points of a shape unit representing a nose. From each of these shape units, additional measurements may be made by the 3D facial recognition and reconstruction engine 116 and stored. In the case of FIG. 4B, for example, a nose height can be measured.

In order to generate shape units for a user 3D head model, the 3D facial engine 116 may generate point cloud data representing the head and facial features identified from the captured 3D image data, also referred to as depth image data, track a mask, which is referred to as a tracking mask, for example in a mesh form, to the features. Facial features like a brow, a chin, a nose and eyes are identified in the tracking mask. In one embodiment, a reference human head model may be selected based on gender, age, overall head size and head shape of the user. The reference human head mode has its head features defined in terms of space units. Shape unit coefficients are derived based on the tracking mask so that a mask including shape units realistically represents the user's face and head as in the image data. Corresponding points or vertices in the tracking mask and the head reference model are identified. Some examples of such feature points are for example corners of the eyes, nose tip, and lip corners. In one embodiment, coefficient data of vertices of the head reference model are determined as starting positions with respect to an origin of the model, and coefficient data of vertices for ending positions with respect to the same origin are determined based on the tracking mask data. In some embodiments, one or more morph target animation techniques may be used which deform or distort one or more vertices at their starting positions in a mesh to their determined ending positions or morph targets. A matching or close fit criteria may be used for identifying when the ending positions have been reached. The resulting deformed or morphed mesh of vertices is stored in the user 3D head model data 144. For example, coefficient data is stored for each shape unit identifying a 3D shape difference between the morphed mesh of vertices and the head reference mesh model.

In some embodiments, the user 3D facial recognition and reconstruction engine 116 determines and stores (e.g. in 144) a set of measurements identifying head features directly from the tracking mask generated from the image data. For example, the measurements may be 3D measurements relating head features by distance, angle and proportion. The measurements may be represented by vertices in space units like 204 and 206, e.g. a mesh of vertices related to a same frame of reference. In other embodiments, the shape units determined using a head reference model as described above can be used as the measurements and as a basis for even more detailed measurements. In some examples, which measurements are to be performed may be identified by the avatar characterization engine 120 based on rules (e.g. 152) identifying transferable features for the defined art style of an avatar.

The 3D capture device 20 is continuously capturing depth image data of the user, for example at a rate of 30 frames a second. From this data, facial expression changes of the user can be tracked. The 3D facial recognition and reconstruction engine 116 can determine changes in measurements of a set of facial features periodically in accordance with user 3D facial expression metrics 146 for tracking facial changes. Facial action criteria for determined whether the 3D action measurements indicate a change in a user facial feature may be stored in the user 3D facial expression metrics 146. These changes in measurements, in some examples, may be stored as action unit coefficients for action unit meshes or sub-meshes which may be blended into one or more shape units for representing expression changes of a user's face. For transferable expressions, the action unit coefficients for the sub-meshes are mapped to corresponding action units for sub-meshes of corresponding shape units of an avatar character model. As described below, in some examples, an avatar in a defined art style may have rules, like avatar character(s) facial expression definitions and rules 154, which indicate a set of expressions an avatar can make and for which of those expressions, are user expression data transferable. For example, the 3D facial recognition and reconstruction engine 116 can include pattern recognition software which recognizes facial expressions such as a smile or a sigh based on audiovisual capture of the user as well as structures like teeth and a mouth. Details of how a user smiles may include closed lip smile or open mouth smile and may be represented in data as action unit coefficients. In some embodiments, rules for an avatar defined art style like avatar character(s) facial expression definitions and rules 154 may identify facial features of an avatar rather than expressions, which facial features move like the facial features for resembling the user's expressions more faithfully. As part of an initialization process, a user may be prompted for expressions an avatar in a defined art style can make to capture reference image data.

Figure 3B:
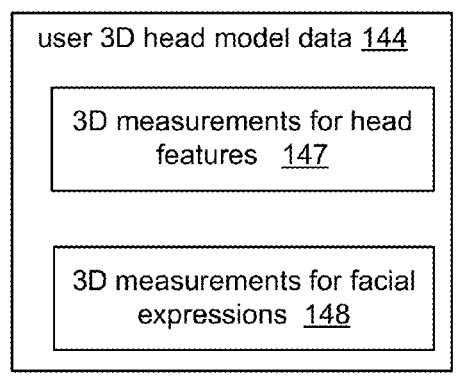
FIGS. 3B and 3C illustrates some examples which may be stored in user 3D head model data.
Figure 3C:
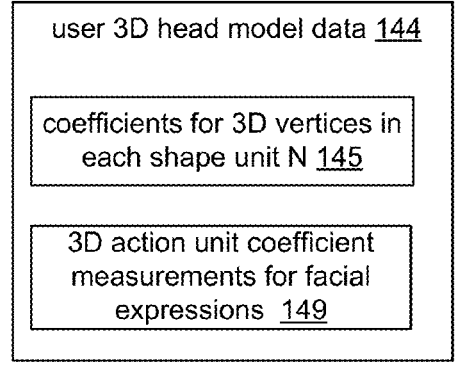

FIGS. 3B and 3C illustrate some examples of data which may be stored in an embodiment of user 3D head model data 144. FIG. 3B illustrates an example including 3D measurements for head features 147 relating head features by distance, angle and proportion and 3D measurements for facial expressions 148. FIG. 3C illustrates an example in which such 3D measurements 147 are embodied as coefficients for 3D vertices in each shape unit N 145, and the 0.3D measurements of changes in facial features for one or more expressions are embodied as 3D action unit coefficient measurements for facial expressions 149.

As discussed more below, different approaches for automatically representing at least a subset of user facial features in an avatar face are described. The avatar characterization engine 120 has access to the user 3D head model data 144 as well as access to avatar character(s) head feature datasets 150 and avatar character(s) head feature rules 152 which may have been registered by one or more applications 128. An avatar character head feature dataset 150 may include stylized features for head features in accordance with an art style defined for the avatar. Besides things like nose shape, and head shape, other options for features like ear shape and size, skin color, hair style and facial furniture like glasses and facial hair may also be defined in a dataset for a type of avatar. Additionally, the avatar character head feature rules 152 can identify avatar features which are displayed independently of user head features and also which user head features are transferable to an avatar in the defined art style. For example, a distinctive eye shape may be maintained for the avatar independently of the eye shape of the user. However, eye separation distance, eye depth and eye width and height are user features which can be represented by the avatar. Such features are referred to as transferable user facial features.

Accessible avatar character facial expression definitions and rules 154 may also be accessed for identifying expressions which the avatar character can make in general and those in which the avatar mimicks from a user, e.g. user transferable expressions. Data, for example action unit coefficients, may be stored for representing the expression by one or more shape units in an avatar head model. There may be rules governing some expressions an avatar does not make such as smiling or how long an expression lasts. Some examples of expressions which may be represented by action unit coefficients include puckered lips, puckered lips with ballooned cheeks, left mount corner down, closed mouth smile, an open mouthed smile, wide open mouth, blinking of an eye, brow squeeze, raised left brow, and raised right brow.

The avatar characterization engine 120 also has access to avatar character(s) head models 153. An avatar head shape may be selected based on a head shape of the user. As mentioned previously, two different approaches are described in the discussion of the figures below for automatically representing at least a subset of user head features from user 3D head model data in a facial avatar of a defined art style.

In one approach, the avatar characterization engine 120 begins with an otherwise featureless 3D head model having the selected avatar head shape. A set of transferable user facial features are represented in the avatar head shape model based on the 3D measurements relating head features by distance, angle and proportion and based on the avatar character's head feature rules 152. Avatar facial features specific to the defined art style are also added as well as adding stylistic elements to the represented user facial features. In some examples, the set of transferable facial features, the other avatar facial features and the stylistic elements are added onto the featureless 3D avatar head model rather than using morphing techniques. Standard blending techniques may be used to automatically blend the avatar facial features and the additional stylistic elements into the 3D head model which may be stored as the user's personalized avatar character in his or her user profile data 130 or other data source (e.g. 126, 132, 136).

In another approach, the avatar character head models 153 are reference head models with features defined in space units for the particular art style defined for a particular avatar character head model. The user facial features transferable to the avatar as represented by their shape unit coefficients computed for the user 3D head model can serve as morph targets. A set of remapping rules like avatar remapping rules 155 can apply a remapping function defined for each shape unit based on its shape. Each remapping rule operates on a single input shape unit and maps to a single output shape unit.

For illustrative purposes, the method embodiments below are described in the context of the system and apparatus embodiments described above. However, the method embodiments are not limited to operating in the system embodiments described above and may be implemented in other system embodiments.

FIG. 5A illustrates a flowchart of an embodiment of a method for generating a user 3D head model based on captured 3D image data. In step 201, one or more processors executing software like the 3D object recognition software 114 generate a point cloud based on the captured 3D image data. Facial recognition software like 3D facial recognition and reconstruction engine 116 identifies head features including facial features in the point cloud in step 203, and in step 205 fits a 3D mesh to the head features including the facial features in the point cloud. In step 208, a set of measurements relating the head features including the facial features of the 3D mesh by a distance, an angle or a proportion are determined and stored. In step 210, the set of measurements and the 3D mesh are stored as a user 3D head model for example by the 3D facial and reconstruction engine 116.

FIG. 5B illustrates a flowchart of a more detailed embodiment for fitting a 3D mesh to the head features including the facial features in the point cloud and determining and storing measurements as in steps 205, 208 and 210. In step 212, a 3D tracking mesh is generated for the head features including the facial features in the point cloud. The 3D facial engine 116, for example in step 214, determines a head size and head shape from the tracking mesh, and in step 216, selects a human head reference mesh model with N predefined 3D shape units based on the head size and head shape. In step 218, one or more corresponding points of head features in the 3D tracking mesh and the human head reference mesh model are identified. In step 220, software like the 3D facial recognition and reconstruction engine 116 executing on one or more processors iteratively performs a morph target animation technique operating on the shape units of the human head reference mesh model until a matching criteria with the tracking mesh is satisfied. The matching criteria may be a defined in terms of an allowable offset in 3D between the vertices of the morphed reference mesh and the tracking mesh. In step 222, the 3D coefficients data for each point in each respective shape unit N which satisfied the matching criteria are stored as coefficient data of the user 3D head model.

Figures 6A, 6B:
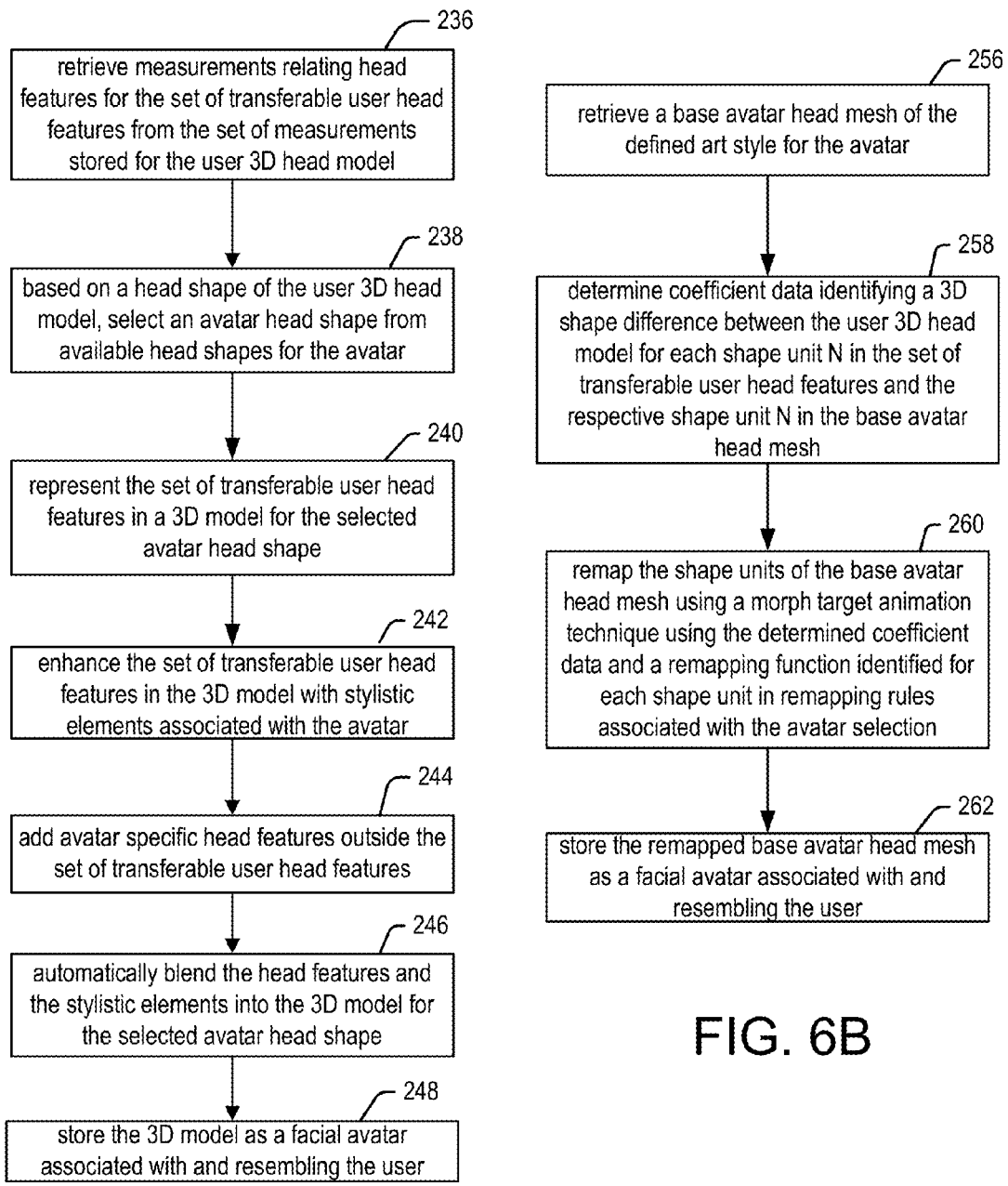
FIG. 6A illustrates a flowchart of an embodiment of a process for automatically generating a facial avatar in the defined art style including a set of avatar character head features representing user transferable head features.
FIG. 6B illustrates a flowchart of another embodiment of a process for automatically generating a facial avatar in the defined art style including a set of avatar character head features representing user transferable head features.

FIG. 6A illustrates a flowchart of an embodiment of a process for automatically generating a facial avatar in the defined art style including a set of avatar character head features representing user transferable head features. In other words, the process embodiment automatically represents at least a subset of user head features from the user 3D head model in a facial avatar of a defined art style in order for the avatar to resemble the user. In many instances, user input identifies a selection of an avatar in a defined art style for an application like the avatar characterization engine 120. For example, user 18 in FIG. 1A uses natural user input to select an application and an avatar character he wishes to represent him from a menu. In other examples, the application may select a type of avatar for a user based on game points or a game level a user has achieved. As per the example of FIG. 1B, a set of transferable user head features and a set of avatar character head features to represent the set of transferable user head features have been identified based on rules associated with the avatar selection. An example of such rules is the avatar character head features rules 152 illustrated in FIG. 3A. In step 236, measurements relating head features for the set of transferable user head features are retrieved, for example by the avatar characterization engine 120, from the set of measurements (e.g. 147, 145) relating the head features including the facial features stored for the user 3D head model. In step 238, software like the avatar engine 120 executing on one or more processors, selects an avatar head shape from available head shapes for the avatar based on a head shape of the user 3D head model. For example, the avatar character head models 153 may provide different versions of the same avatar type of character, e.g. soldier, for a round head, a square head and an angular head. Additionally, the head reference models may include models for more nuanced head shapes.

In step 240, the set of transferable user head features are represented in a 3D model for the selected avatar head shape, and are enhanced in step 242 with stylistic elements associated with the avatar. Again, in some instances, a user transferable feature is not directly represented in the avatar, but may be represented by a symbol or feature of a symbol, like a hat shape. Additionally, a user feature may not be represented to the same degree as in the examples of FIGS. 8A, 8B and 8C discussed below. Avatar specific head features outside the set of transferable user head features, also referred to as user independent features, are added in step 244. In the embodiment of FIG. 3A, avatar character head features stored in datastore 150 are a source for data defining avatar features and associated stylistic elements. In step 246, standard blending techniques may be used to automatically blend the head features and the stylistic elements into the 3D model for the selected avatar head shape, which 3D model may then be stored in step 248 as a facial avatar associated with the user, and which resembles the user. Blending criteria may be stored in the avatar datasets 150 or avatar rules 152.

In some examples, a selected avatar head shape can be represented as point cloud data. The user transferable head features, the user independent head features, and the stylistic elements can also be represented as point cloud data. A user's facial avatar can then be generated as a 3D rig head mesh connecting the point cloud date of these features and stylistic elements. In other examples, a 3D avatar head model selected for the user based on the user head shape model can use morph target techniques to represent the set of transferable user head features and additive techniques used to add on and blend user independent avatar character head features and the stylistic elements.

FIG. 6B illustrates a flowchart of another embodiment of a process for automatically generating a facial avatar in the defined art style including a set of avatar character head features representing user transferable head features. In other words, the process embodiment automatically represents at least a subset of user head features from the user 3D head model in a facial avatar of a defined art style. In step 256, a base avatar head mesh of the defined art style is retrieved. The base avatar head mesh may also be defined in terms of shape units for easier mapping with user 3D head models.

In many examples, the facial and head features of the base avatar head mesh are stored with the stylistic elements of the art style already included. In some examples, a single base head mesh for a type of avatar character, as may be stored in the avatar character head models, suffices as a basis for the deformations to be performed. In other examples, an avatar base head mesh may be selected from a group of available base mesh models for the character which vary in head shape and size.

In step 258, coefficient data identifying a 3D shape difference between the user 3D head model for each shape unit N in the set of transferable user head features and the respective shape unit N in the base avatar head mesh is determined. The coefficients for the shape units of the user 3D head model were previously determined via iterations and stored (e.g. steps 220 and 222 in FIG. 5B). In step 260, the shape units of the base avatar head mesh are remapped using a morph target animation technique using the determined coefficient data and a remapping function identified for each shape unit in avatar remapping rules 155 associated with the avatar selection.

In step 262, the remapped base avatar head mesh is stored as a facial avatar associated with and resembling the user. Additionally, blending of the shape units of the remapped base avatar head mesh may be performed for satisfying stored blending criteria, for example as stored in either or both of the avatar character head feature datasets 150 or rules 152. An example of blending criteria may be limits on a distance change between adjacent vertices in any of the 3D dimensions. Texture and color are added as well to the remapped base avatar head mesh personalized for the user based on rules associated with head features in the defined art style of the avatar.

Figure 7:
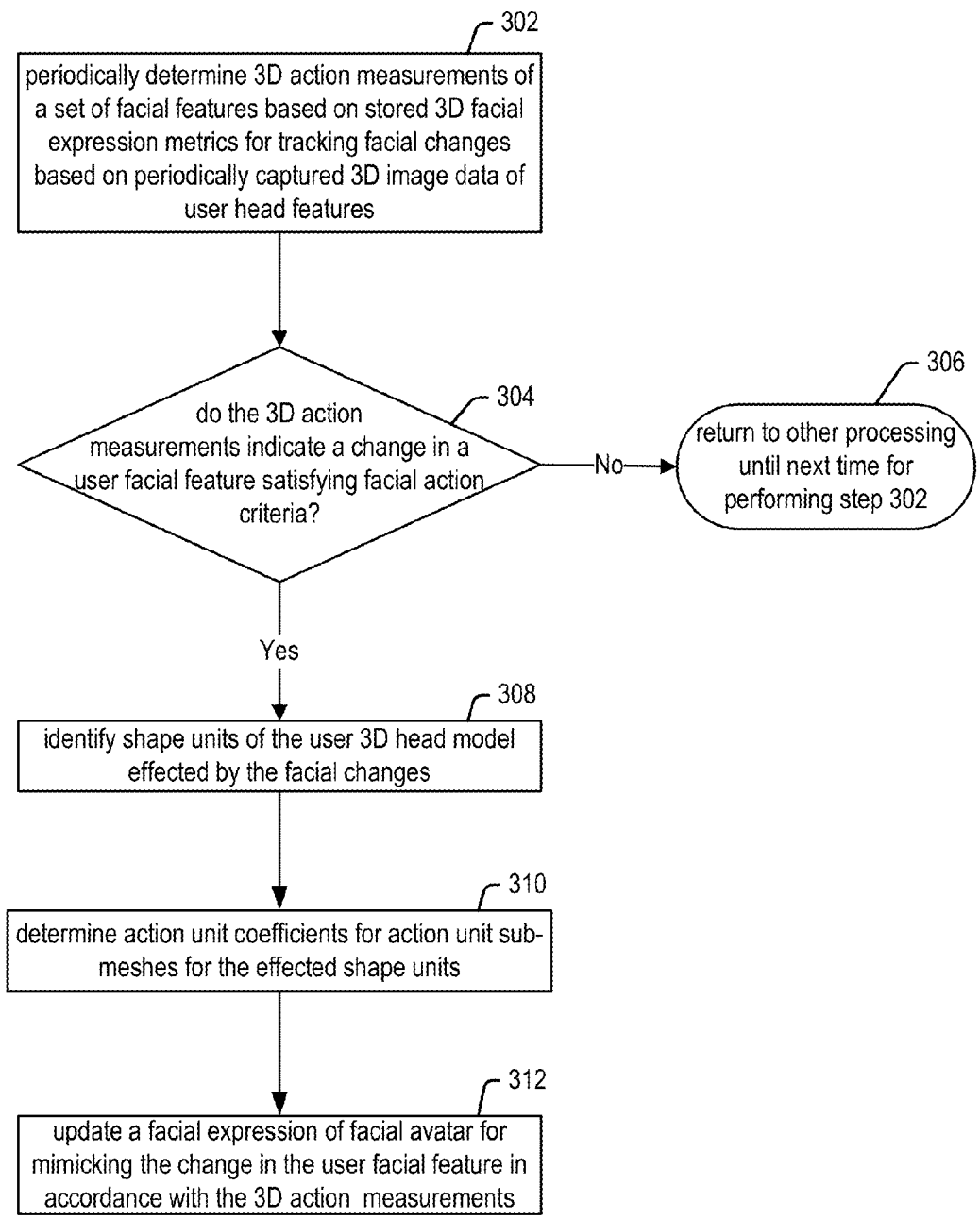
FIG. 7 illustrates a flowchart of a process example of updating a facial expression of the facial avatar responsive to changes detected in user facial features.

FIG. 7 illustrates a flowchart of a process example of updating a facial expression of the facial avatar responsive to changes detected in user facial features. In step 302, 3D action measurements of a set of facial features are periodically determined based on stored 3D facial expression metrics (e.g. 146) for tracking facial changes based on periodically captured 3D image data of user head features. In step 304, it is determined whether the 3D action measurements indicate a change in a user facial feature satisfying facial action criteria. If not, in step 306, control is returned for other processing until the next time for the periodic performance of step 302.

Responsive to the 3D action measurements indicating a change in a user facial feature satisfying facial action criteria, shape units of the user 3D head model effected by the facial changes are identified in step 308, and action unit coefficients are determined in step 310 for action unit sub-meshes for the effected shape units. In step 312, a facial expression of the facial avatar is updated to mimick the change in the user facial feature in accordance with the 3D action measurements. For example, in order to mimick the change, the 3D action coefficients for the action sub-meshes also effect an underlying 3D rig model for the user's facial avatar head mesh model.

Figure 8C:
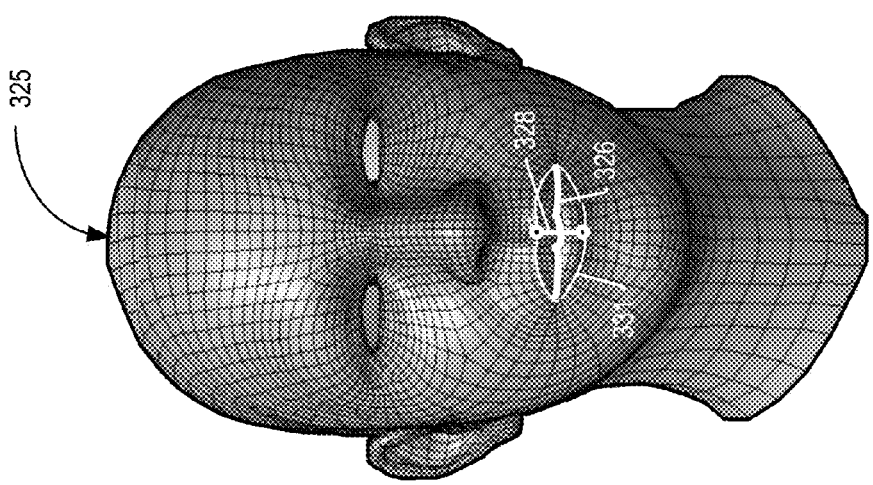
FIGS. 8A, 8B and 8C illustrate an example of representing a user head feature of bowed lips from the user 3D head model in a facial avatar of a defined art style.
Figure 8B:
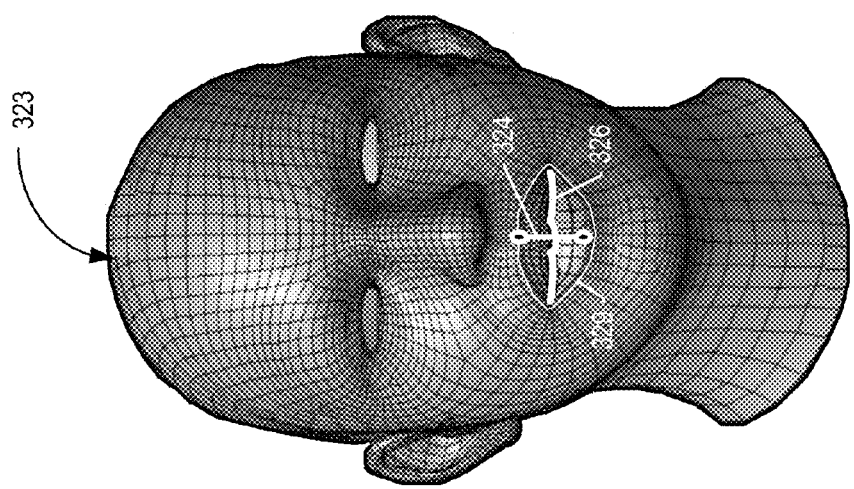
Figure 8A:
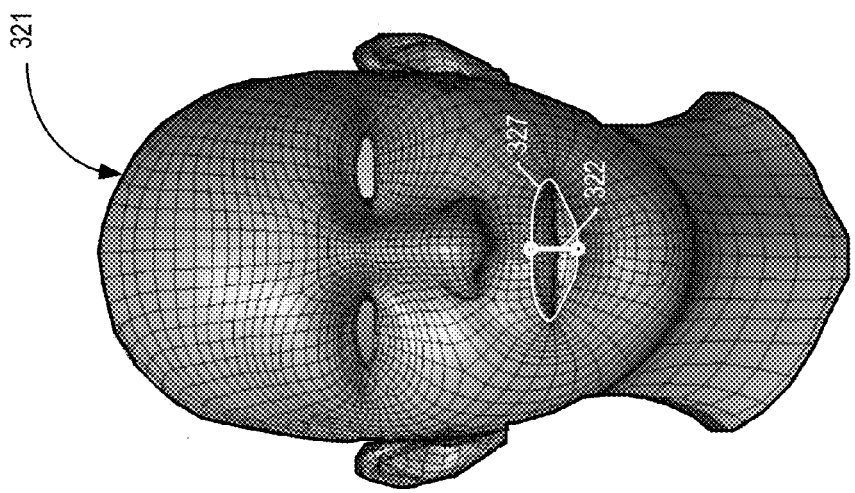

FIGS. 8A, 8B and 8C illustrate an example of representing a user head feature of bowed lips from the user 3D head model in a facial avatar of a defined art style. These examples result from performing an automatic representation of at least a subset of user features in an avatar like in the embodiment in FIG. 6A. FIG. 8A represents a human head reference model 321 from which a user 3D head model 323 for the user is being generated. In the reference model 321, the lips are thin as indicated by the lip height 322. FIG. 8B represents a user 3D head model 323 generated for the user. The user's lips as indicated by lip height 324 are full lips which meet in a bowed line configuration 326. FIG. 8C illustrates an avatar head reference mesh model being stylized with user transferable features. In building the avatar stylized head model 325 depicted in FIG. 8C, a lip height and lip fullness dimensions such as the user's are beyond avatar feature dimension criteria, and thus lip height 328 in the avatar is less than the full lips 324, and in this case has the same height 322 as the reference head model. However, the geometry of the meeting of the lips implements the user's bowed lip line configuration 326. Additionally, the lip shape 331 is more bowed than the reference model in lip outline shape 327, but less so than the fullness of the user's actual lip shape 329 as illustrated in FIG. 8B. In the examples of FIG. 3A, avatar feature dimension criteria may be stored in either or both of the avatar character(s) head feature datasets 150 or the avatar character head features rules 152.

Figure 9C:
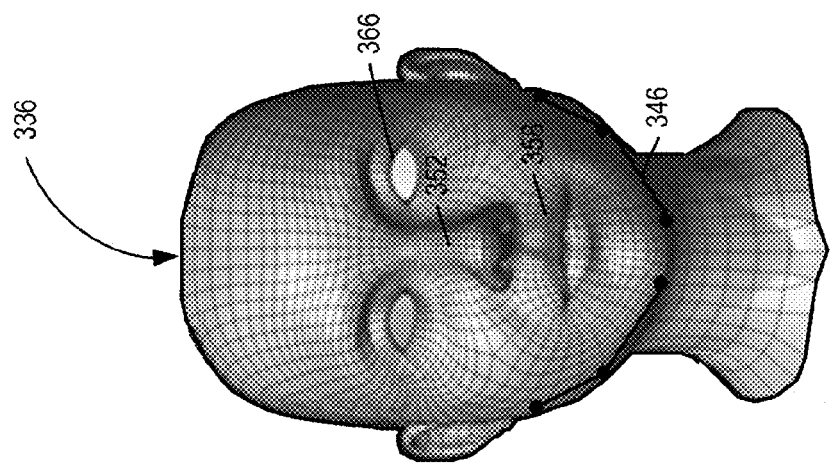
FIGS. 9A, 9B and 9C illustrate an example of representing a number of user head features including a jaw shape from the user 3D head model in a facial avatar of a defined art style.
Figure 9B:
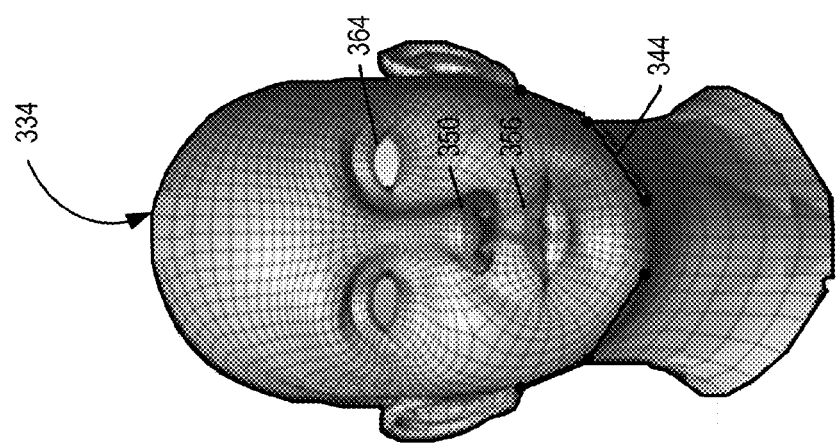
Figure 9A:
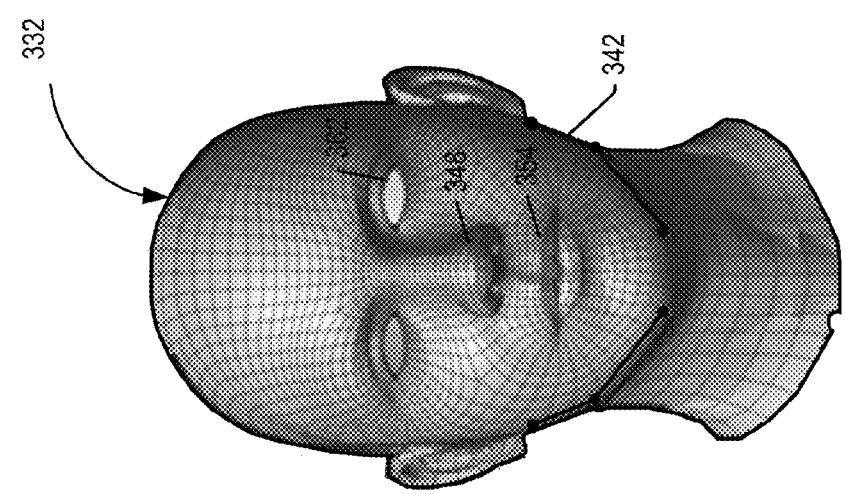

FIGS. 9A, 9B and 9C illustrate an example of representing a number of user head features including a jaw shape 344 from the user 3D head model in a facial avatar of a defined art style. These examples result from performing an automatic representation of at least a subset of user features 346, 358, 352, 366 in an avatar like in the embodiment in FIG. 6A. As in FIGS. 8A, 8B and 8C, the FIG. 9A illustrates a human head reference model 332 from which a user 3D head model 334 illustrated in FIG. 9B has been derived. The user 3D head model 334 differs in jaw and chin shape from the base model as indicated by outlines 342 and 344 as well as in eye shape, nose shape and mouth shape as indicated by respective reference numerals 362, 348 and 354 for the head reference model 332 and 364, 350 and 356 in the user 3D head model 334. Outlines of the eye shape, nose shape and lip or mouth shape are not shown to avoid overcrowding the drawings. FIG. 9C represents a 3D model 336 for the selected avatar head shape, round in this example, in which transferable user facial features are being represented. The user's eye shape 366 has been included as well as nose shape 352 and mouth shape and size 358. As illustrated, although the avatar head 336 is fuller, a mesh line section incorporates the angles defining the jaw shape and chin shape as indicated by outlines 346. By giving the avatar a double chin effect, the user's facial features of chin shape and jaw shape are transferred to the avatar to maintain the resemblance yet different viewing experience which allows the user to connect with an avatar but step outside himself in the avatar at the same time.

FIG. 10 illustrates examples of an avatar base head model being morphed into an avatar incorporating the user facial features in accordance with a method like that described in FIG. 6B. In this example, an avatar 414 in an "Epoch" art style is being made for the user. The face masks 402 in the left most column illustrate representative 3D shape units reflecting respective facial or head features of the user, in this case shape units 404 and 406 of approximately exemplary 80 shape units in his user 3D head model. For each shape unit, a base avatar head 408 of the Epoch style has one of its shape units morphed to be like the corresponding shape unit of the user's 3D head model in the left most column. For illustrative purposes, avatar head 410 is shown incorporating the user's chin shape unit 404, and avatar head 412 is shown incorporating the user's nose shape unit 406. However, a same reference head model is morphed to include all the shape units. All the distortions of the morphs to the avatar base model are multiplied together and result in the styled avatar 414 in the right most column.

Figure 11:
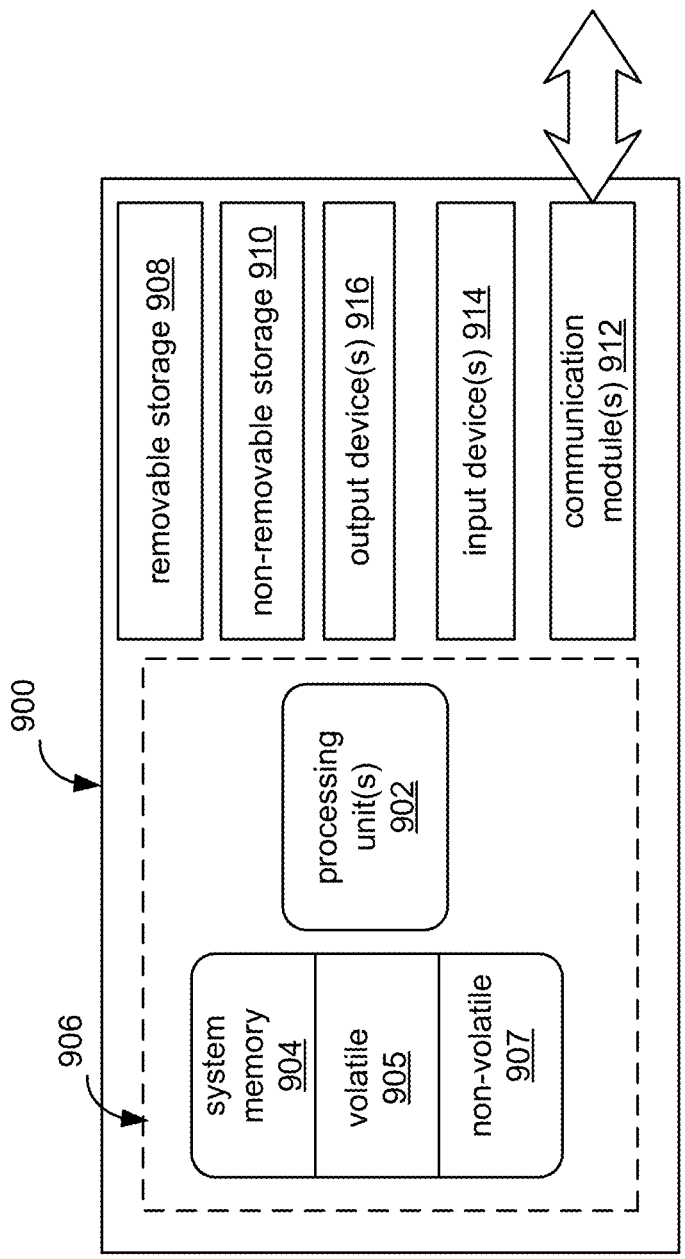
FIG. 11 illustrates an example embodiment of a computer system that may be used to embody and implement system and method embodiments of the technology.

FIG. 11 illustrates an example embodiment of a computer system that may be used to embody and implement system and method embodiments of the technology. For example, FIG. 11 is a block diagram of an embodiment of a computer system like computer system 12 or remote computer system 112 as well as other types of computer systems such as mobile devices. The scale, quantity and complexity of the different exemplary components discussed below will vary with the complexity of the computer system. FIG. 11 illustrates an exemplary computer system 900. In its most basic configuration, computing system 900 typically includes one or more processing units 902 including one or more central processing units (CPU) and one or more graphics processing units (GPU). Computer system 900 also includes memory 904. Depending on the exact configuration and type of computer system, memory 904 may include volatile memory 905 (such as RAM), non-volatile memory 907 (such as ROM, flash memory, etc.) or some combination of the two. This most basic configuration is illustrated in FIG. 11 by dashed line 906. Additionally, computer system 900 may also have additional features/functionality. For example, computer system 900 may also include additional storage (removable and/or non-removable) including, but not limited to, magnetic or optical disks or tape. Such additional storage is illustrated in FIG. 11 by removable storage 908 and non-removable storage 910.

Computer system 900 may also contain communication module(s) 912 including one or more network interfaces and transceivers that allow the device to communicate with other computer systems. Computer system 900 may also have input device(s) 914 such as keyboard, mouse, pen, voice input device, touch input device, etc. Output device(s) 916 such as a display, speakers, printer, etc. may also be included.

The example computer systems illustrated in the figures include examples of computer readable storage devices. A computer readable storage device is also a processor readable storage device. Such devices may include volatile and nonvolatile, removable and non-removable memory devices for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. One or more processor readable storage devices having encoded thereon instructions for causing one or more processors to perform a method for automatically generating a facial avatar resembling a user in a defined art style, the method comprising:
   generating a user head model for the user based on captured image data by one or more processors communicatively coupled to a capture device;
   identifying a set of transferable user head features from the user head model which can be represented in the facial avatar based on transferable head feature rules for the defined art style;
   identifying a set of avatar character head features to represent the set of transferable user head features based on the transferable head feature rules for the defined art style by:
      identifying one or more user head features which can be represented by one or more symbol features in the defined art style of the avatar based on transferable head feature rules for the defined art style; and
      representing the one or more user head features by the one or more symbol features into a model for a selected avatar head shape;
   generating the facial avatar in the defined art style including the set of avatar character head features;
   displaying the facial avatar by a display communicatively coupled to the one or more processors;
   updating a facial expression of the facial avatar responsive to changes detected in user facial features; and
   updating display of the facial avatar with the updated facial expression.

2. The one or more processor readable storage devices of claim 1 wherein generating the user head model for the user based on the captured image data by one or more processors communicatively coupled to the capture device further comprises:
   generating by the one or more processors a point cloud based on the captured image data;
   identifying the head features including the facial features in the point cloud;
   fitting a tracking mesh to the head features including the facial features in the point cloud;
   determining a set of measurements relating the head features including the facial features of the 3D mesh by a distance, an angle or a proportion; and
   storing the set of measurements and the mesh as the user head model.

3. The one or more processor readable storage devices of claim 2 wherein determining the set of measurements relating the head features including the facial features of the mesh by a distance, an angle or a proportion further comprises:
   determining a head size and head shape from the tracking mesh,
   selecting a human head reference mesh model with N predefined shape units based on the head size and head shape,
   identifying one or more corresponding points of the head features in the tracking mesh and the human head reference mesh model, and iteratively performing a morph target animation technique operating on the shape units of the human head reference mesh model until a matching criteria with the tracking mesh is satisfied; and wherein storing the set of measurements and the mesh as the user head model further comprises storing as coefficient data of the user head model the coefficients data for each point in each respective shape unit N which satisfied the matching criteria.

4. The one or more processor readable storage devices of claim 1 wherein generating the facial avatar in the defined art style including the set of avatar character head features representing the set of transferable user head features further comprises:

retrieving a base avatar head mesh of the defined art style;

determining coefficient data identifying a shape difference between the user head model for each shape unit N in the set of transferable user head features and the respective shape unit N in the base avatar head mesh;

remapping the shape units of the base avatar head mesh using a morph target animation technique using the determined coefficient data and a remapping function identified for each shape unit in remapping rules associated with the avatar selection; and storing the remapped base avatar head mesh as the facial avatar associated with and resembling the user.

5. The one or more processor readable storage devices of claim 4 further comprising:

performing blending of the shape units of the remapped base avatar head mesh for satisfying blending criteria; and adding texture and color to the remapped base avatar head mesh personalized for the user based on rules associated with head features in the defined art style of the avatar.

6. The one or more processor readable storage devices of claim 1 wherein updating the facial expression of the facial avatar responsive to changes detected in user facial features further comprises:

periodically determining action measurements of a set of facial features based on stored 3D facial expression metrics for tracking facial changes based on periodically captured image data of the user head features; and responsive to the action measurements indicating a change in a user facial feature satisfying facial action criteria, identifying shape units of the user head model effected by the facial changes;

determining action unit coefficients for action unit submeshes for the effected shape units, and updating a facial expression of the facial avatar for mimicking the change in the user facial feature in accordance with the action measurements.

7. A method for automatically generating a facial avatar resembling a user in a defined art style comprising:

capturing image data of user head features including facial features by a capture device;

generating a user head model for the user based on the captured image data by one or more processors communicatively coupled to the capture device;

identifying a set of transferable user head features from the user head model which can be represented in the facial avatar based on transferable head feature rules for the defined art style;

identifying a set of avatar character head features to represent the set of transferable user head features based on the transferable head feature rules for the defined art style by:

identifying one or more user head features which can be represented by one or more symbol features in the defined art style of the avatar based on transferable head feature rules for the defined art style, representing the one or more user head features by the one or more symbol features into a 3D model for a selected avatar head shape, and wherein the transferable head feature rules directing which of the facial features are transferable to the facial avatar for the defined art style;

generating the facial avatar in the defined art style including the set of avatar character head features; and displaying the facial avatar by a display communicatively coupled to the one or more processors.

8. The method of claim 7 wherein generating the user head model for the user based on the captured image data by one or more processors communicatively coupled to the capture device further comprises:

generating by the one or more processors a point cloud based on the captured image data;

identifying the head features including the facial features in the point cloud;

fitting a mesh to the head features including the facial features in the point cloud;

determining the set of measurements relating the head features including the facial features of the mesh by at least one of a distance, an angle or a proportion; and storing the set of measurements and the mesh as the user head model.

9. The method of claim 8 where fitting a mesh to the head features including the facial features in the point cloud further comprises:

generating a tracking mesh for the head features including the facial features in the point cloud.

10. The method of claim 9 wherein determining the set of measurements relating the head features including the facial features of the mesh by at least one of a distance, an angle or a proportion further comprises:

determining a head size and head shape from the tracking mesh, selecting a human head reference mesh model with N predefined shape units based on the head size and head shape, identifying one or more corresponding points of the head features in the tracking mesh and the human head reference mesh model, and iteratively performing a morph target animation technique operating on the shape units of the human head reference mesh model until a matching criteria with the tracking mesh is satisfied; and wherein storing the set of measurements and the mesh as the user head model further comprises storing as coefficient data of the user head model the coefficients data for each point in each respective shape unit N which satisfied the matching criteria.

11. The method of claim 10 wherein generating the facial avatar in the defined art style including the set of avatar character head features further comprises:

retrieving measurements relating the head features for the set of transferable user head features from the set of measurements relating the head features including the facial features stored for the user 3D head model, based on a head shape of the user head model, selecting an avatar head shape from available head shapes for the avatar, representing the set of transferable user head features in a model for the selected avatar head shape, enhancing the set of transferable user head features in the model with stylistic elements associated with the avatar, adding avatar specific head features outside the set of transferable user head features, automatically blending the avatar specific head features and the stylistic elements into the model for the selected avatar head shape, and storing the model as the facial avatar associated with and resembling the user.

12. The method of claim 11 wherein representing the set of transferable user head features in a model for the selected avatar head shape further comprises:

representing the selected avatar head shape as point cloud data;

representing the set of transferable user head features and the avatar specific head features outside the set of transferable user head features as point cloud data; and generating a mesh connecting the point cloud data as the model for the selected avatar head shape.

13. The method of claim 7 wherein updating a facial expression of the facial avatar responsive to changes detected in user facial features further comprises:

periodically determining action measurements of a set of facial features based on stored facial expression metrics for tracking facial changes based on periodically captured image data of user head features; and responsive to the action measurements indicating a change in a user facial feature satisfying facial action criteria, updating the facial expression of the facial avatar to mimic the change in the user facial feature in accordance with the action measurements.

14. A system for automatically generating a facial avatar resembling a user in a defined art style comprising:

one or more image capture devices including one or more depth sensors;

one or more displays;

one or more memories for storing measurement metrics for user head model data and rules identifying a set of transferable user head features which can be represented by the facial avatar;

one or more processors having access to the one or more memories and being communicatively coupled to the one or more image capture devices for receiving image data including a depth value for user head features including facial features and being communicatively coupled to the one or more displays;

the one or more processors generating a user head model for the user based on the image data communicatively coupled to the one or more capture devices;

the one or more processors identifying the set of transferable user head features from the user head model which can be represented in the facial avatar based on transferable head feature rules for the defined art style;

the one or more processors identifying a set of avatar character head features to represent the set of transferable user head features based on the transferable head feature rules for the defined art style, the transferable head feature rules directing which of the facial features are transferable to the facial avatar for the defined art style;

the one or more processors iteratively performing a morph target animation technique operating on shape units of a human head reference mesh model until a matching criteria with a tracking mesh is satisfied, the one or more processors storing a set of measurements relating the head features and the tracking mesh as the user head model, including storing as coefficient data of the user head model the coefficients data for each point in each respective shape unit which satisfied the matching criteria;

the one or more processors generating the facial avatar in the defined art style including the set of avatar character head features; and the one or more processors displaying the facial avatar by the one or more displays.

15. The system of claim 14 wherein the one or more processors generating the user head model for the user based on the captured image data communicatively coupled to the capture device further comprises:

generating a point cloud based on the captured image data;

identifying the head features including the facial features in the point cloud;

fitting a tracking mesh to the head features including the facial features in the point cloud;

determining a set of measurements relating the head features including the facial features of the mesh by a distance, an angle or a proportion; and storing the set of measurements and the mesh as the user head model.

16. The system of claim 15 wherein determining the set of measurements relating the head features including the facial features of the mesh by a distance, an angle or a proportion further comprises the one or more processors:

determining a head size and head shape from the tracking mesh, selecting a human head reference mesh model with N predefined shape units based on the head size and head shape, identifying one or more corresponding points of the head features in the tracking mesh and the human head reference mesh model.

17. The system of claim 14 wherein generating the facial avatar in the defined art style including the set of avatar character head features representing the set of transferable user head features further comprises the one or more processors:

retrieving a base avatar head mesh of the defined art style;

determining coefficient data identifying a shape difference between the user head model for each shape unit N in the set of transferable user head features and the respective shape unit N in the base avatar head mesh;

remapping the shape units of the base avatar head mesh using a morph target animation technique using the determined coefficient data and a remapping function identified for each shape unit in remapping rules associated with the avatar selection; and storing the remapped base avatar head mesh as the facial avatar associated with and resembling the user.

18. The system of claim 17 further comprising the one or more processors:

performing blending of the shape units of the remapped base avatar head mesh for satisfying blending criteria; and adding texture and color to the remapped base avatar head mesh personalized for the user based on rules associated with head features in the defined art style of the avatar.

19. The system of claim 14 further comprising the one or more processors updating a facial expression of the facial avatar responsive to changes detected in user facial features by:
- periodically determining action measurements of a set of the facial features based on stored 3D facial expression metrics for tracking facial changes based on periodically captured image data of user head features; and
- responsive to the action measurements indicating a change in a user facial feature satisfying facial action criteria,
- identifying shape units of the user head model effected by the facial changes;
- determining action unit coefficients for action unit submeshes for the effected shape units, and
- updating the facial expression of the facial avatar for mimicking the change in the user facial feature in accordance with the action measurements.

20. The system of claim 14, wherein the identifying a set of avatar character head features to represent the set of transferable user head features based on the transferable head feature rules for the defined art style further comprises the one or more processors:
- identifying one or more user head features which can be represented by one or more symbol features in the defined art style of the avatar based on the transferable head feature rules for the defined art style; and
- representing the one or more user head features by the one or more symbol features into the model for the selected avatar head shape.

* * * * *